United States Patent Office 2,927,902
Patented Mar. 8, 1960

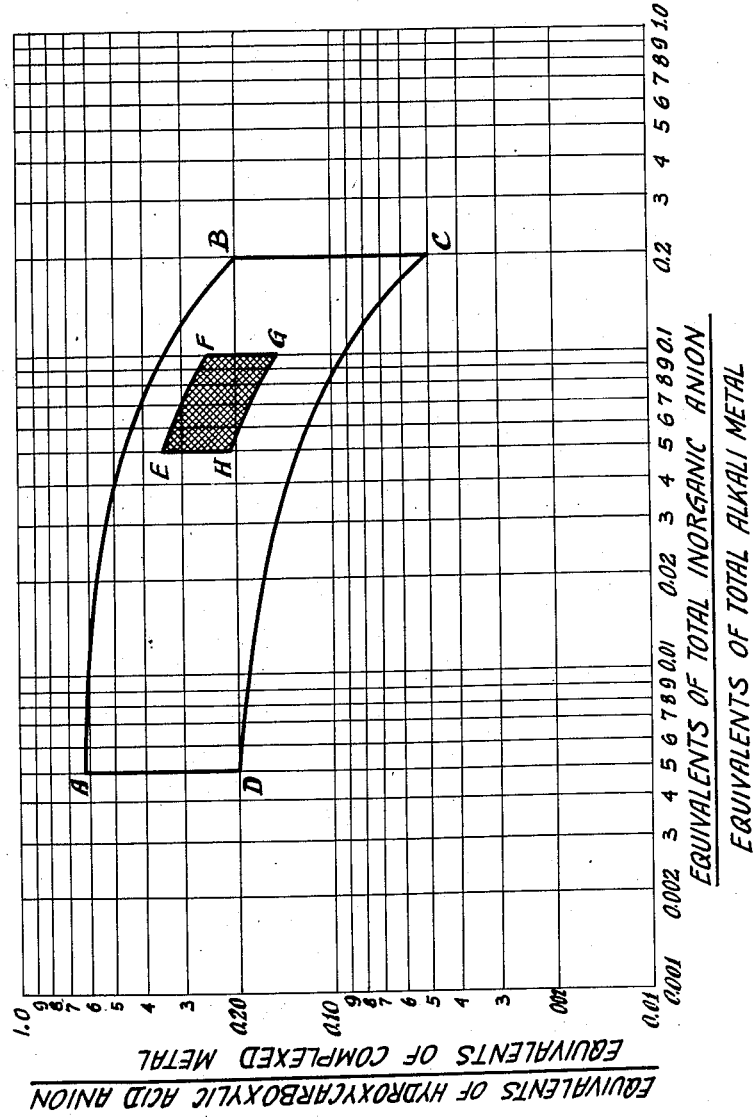

2,927,902

PROCESS FOR THE PREPARATION OF INORGANIC GELS

Robert H. Cramer, Woodbury, N.J., and Albert B. Schwartz, Philadelphia, Pa., assignors to Socony Mobil Oil Company, Inc., a corporation of New York Application March 28, 1956, Serial No. 574,486

10 Claims. (Cl. 252—463)

This application is a continuation-in-part of our copending application Serial No. 489,482, filed February 21, 1955.

The invention described herein relates to an improved process for the formation of porous adsorptive inorganic gels. More particularly, the present invention is concerned with the preparation of hydrogels having a solids content consisting essentially of a major proportion of alumina and a minor proportion of at least one other metal or metal oxide. In particular, the invention is directed to the production of hydrosols and hydrogels characterized by a relatively high solids content, i.e., greater than about 5% by weight, which hydrogels can be subjected to subsequent wet processing operations without effecting appreciable disintegration thereof.

Various methods for producing gels consisting essentially of a major proportion of alumina and a minor proportion of a metal or metal oxide have heretofore been proposed. In many of the previously suggested processes for manufacturing such gels, extensive washing of the hydrogel is required to remove impurities in order that the final product possess the desired properties. Such extensive washing has been detrimental to the yield of product since a considerable amount of hydrogel ordinarily undergoes disintegration during such step. While other processes have been developed wherein hydrosols are produced directly in a substantially pure state and which do not require washing of the resulting hydrogel, these processes generally result in the formation of a hydrosol having a solids content so low that considerable concentration must be effected. Such methods of preparation are accordingly not well adapted for large scale manufacture of alumina-metal oxide or alumina-metal gels since the handling of extremely large quantities of dilute solutions and the drying of hydrogels of low solids content are required. In addition, such hydrosols and the corresponding hydrogels produced therefrom, possessing a comparatively low solids content have not been suitable for the production of bead-like spheroidal gel particles by well known methods involving introduction of a hydrosol in the form of globules into a water-immiscible medium in which the sol globules set to hydrogel beads.

One of the principal objects of the present invention is the provision of a process for preparing hydrogels of alumina and other metal oxide or metal, which hydrogels can be washed or otherwise subjected to wet processing, i.e., contacted with aqueous media, without undergoing appreciable disintegration. Another object of the invention is to afford a method for producing hydrosols and hydrogels consisting essentially of a major proportion of alumina and a minor proportion of other metal oxide or metal having a solids content greater than about 5% by weight. A still further object is the production of quick-setting alumina-metal and alumina-metal oxide hydrosols capable of being manufactured into hard gel spheroids in accordance with the above-noted well known methods.

The above and other objects which will be apparent to those skilled in the art are achieved in accordance with the present invention wherein hydrogels consisting essentially of a major proportion of alumina and a minor proportion of at least one other metal or metal oxide are prepared by intimately admixing solutions of an alkali metal aluminate, a hydroxy carboxylic acid or salt thereof, and an inorganic water-soluble compound which, upon subsequent decomposition, furnishes the aforesaid metal or metal oxide. The reactant solutions are mixed in controlled quantities to yield an alumina-metal or alumina-metal oxide sol which sets to an all-embracing precipitate-free hydrogel.

It is emphasized that the present process is directed to a method of preparing hydrogels as distinguished from gelatinous precipitates. It has heretofore been taught that the presence of electrolyte salts in an alumina-containing hydrogel forming mixture has the detrimental effect of coagulating the aluminum ions in the form of an irreversible gelatinous precipitate and not in the form of a true hydrogel. The gelatinous precipitates so produced are incapable of being formed into desired spheroidal particles by introduction thereof in a water-immiscible liquid in accordance with procedures well known in the art and, further, have disadvantages of being structurally weak as compared with true hydrogels and of generally possessing a heterogeneous structure in comparison with the homogeneous structure achieved with true hydrogel formation. In accordance with the present invention, it has now been discovered that the presence in the hydrogel forming mixture of an electrolyte compound of the metal which it is desired to cogel with alumina under the conditions hereinafter set forth does not serve to coagulate the reactants in the form of a gelatinous precipitate as would be expected from prior art teachings but, on the contrary, affords the formation of a hydrogel which can be subjected to extensive washing with distinctly less disintegration than a corresponding hydrogel prepared in the absence of such electrolyte compound.

The present invention thus contemplates an improved method for preparing hydrogels consisting essentially of a major proportion of alumina and a minor proportion of other metal oxide or metal which, when dried, yield porous adsorptive alumina-metal or metal oxide gels. In order to produce such hydrogels having a high solids content and capable of being subjected to subsequent wet processing operations without undergoing disintegration, it has been discovered that certain critical conditions must be observed during formation. It has been found that a stable hydrogel of alumina and other metal or metal oxide component having a short time of set and a high solids content may readily be prepared by mixing aqueous solutions of an alkali metal aluminate, a hydroxy carboxylic acid or salt thereof, and an inorganic water-soluble compound which, upon subsequent decomposition, furnishes said component and controlling the ratio equivalents of total inorganic anion to total alkali metal and the ratio equivalents of hydroxy carboxylic acid anion to total metal in the reaction mixture undergoing complex formation with hydroxy carboxylic acid anion. Metals which can be complexed with hydroxycarboxylic anions include, among others: aluminum, chromium, iron, cobalt, manganese, nickel, calcium, titanium, antimony, tin, lead, copper, boron, and molybdenum. Generally, hydrogels prepared by the process described herein are characterized by a gelation time of not more than 2 hours and a solids content of between about 5 and about 30% by weight, although it is to be realized that hydrogels having a longer time of set and a lesser solids content when desired may also be produced by the present method. The method of this invention is particularly suitable for the production of hydrogels characterized by a time of set in the range of 0.5 to 300 seconds.

The particular ratio equivalents above-described contained in the reaction mixture will depend upon the exact nature of the alumina-metal oxide or alumina-metal hydrogel desired. These ratio equivalents may be readily ascertained by those skilled in the art following the principles of this invention. Temperature, pH, and solids content are interrelated variables effecting gelation and, within the limits in which formation of hydrogels occurs, they control gelation time. In general, the other factors can be controlled to achieve gelation at any practical solution temperature. The pH of the hydrogel should generally be maintained on the alkaline side, i.e., above about 7. In particular, it is preferred that the pH of the hydrogel be within the approximate range of 10.5 to 12.5.

As the alkali metal aluminate reactant, lithium, sodium, or potassium aluminate will generally be employed, although it will be realized that aluminates of other alkali metals may also be effectively used. Of the alkali metal aluminates, sodium aluminate is accorded preference for use in the present process. An aqueous solution of the alkali metal aluminate is preferably used. It is generally desirable to add to the solution a small amount of the corresponding alkali metal hydroxide to stabilize the aluminate solution.

Representative but non-limiting examples of the hydroxy carboxylic acids employed are glycolic, lactic, citric, tartaric, gluconic, malic, beta hydroxy butyric, beta hydroxy propionic, glyceric, and salicylic acids. It is preferred to employ an acid in which the hydroxy group is not more than two carbon atoms removed from the carboxyl group. Thus, in the case of aliphatic acids, alpha and beta hydroxy carboxylic acids are preferred. In the case of cyclic or aromatic acids, orthocarboxylic acids are preferred. Salts of the foregoing acids may also be employed, particularly alkali metal and ammonium salts, it being understood that it is essential, in accordance with the instant process, that a hydroxy carboxylic acid anion be present in the hydrosol-forming mixture and that such anion may be introduced from the acid or from salts thereof.

The inorganic water-soluble compound employed containing metal other than aluminum is generally a salt containing the desired metal as the cation or an acid or salt containing the desired metal as the anion. Generally, a compound capable of substantially complete ionization in aqueous solution will be employed. The mineral acid salts of the metal which it is desired to cogel with alumina are typical representative compounds and include the nitrates, sulfates, and chlorides of various metals. It is also contemplated that water-soluble acids or salts containing metals which it is desired to cogel with the alumina may be employed, such as chloroplatinic acid, chloropalladic acid, bromoplatinic acid, ammonium chloroplatinate, etc. Electrolytic water-soluble compounds of a multitude of metals may be suitably employed in the present process, particularly including those of groups I-B, II, III, IV, VI, VII, and VIII of the periodic table. Typical water-soluble compounds for use in the process described herein are those of beryllium, chromium, cobalt, boron, manganese, molybdenum, iron, nickel, silver, tin, magnesium, titanium, tungsten, platinum, zirconium, rhodium, vanadium, zinc, and palladium.

The foregoing reactant solutions are intimately admixed in any desired manner to yield a resultant hydrosol. Thus, the inorganic water-soluble compound containing metal other than aluminum may be initially added in whole or part so that no precipitation is effected to either the hydroxy carboxylic acid solution or the alkali metal aluminate solution prior to mixing the two latter solutions. The solutions may be intimately admixed by flowing streams thereof together under conditions of rapid flow such as in a mixing nozzle. The reactants may be in the form of individual streams or, after initially adding the inorganic metal-containing compound to one reactant solution, the latter may be mixed with the other reactant solution.

It has been found in accordance with the instant invention that a stable hydrogel consisting essentially of a major proportion of alumina and a minor proportion of other metal-containing component either in the form of a metal or oxide thereof can be produced by controlling the ratio of equivalents of the total inorganic anion to total alkali metal and the ratio of equivalents of hydroxy carboxylic acid anion to the total complexed metal, i.e., the combined equivalents of aluminum and other metal complexed by the hydroxy carboxylic acid anion contained in the hydrosol forming solutions. The accompanying drawing presents data graphically, illustrating relationships between the aforesaid ratio equivalents satisfactory for the formation of the desired hydrogels.

Referring more particularly to the drawing, it will be seen that the ratio of equivalents of inorganic anion to equivalents of alkali metal is desirably between about 0.005 and about 0.2 and the ratio of equivalents of hydroxy carboxylic acid anion to the total complexed metal is within the area ABCD. Preferably, the ratio of equivalents of inorganic anion to equivalents of total alkali metal is between about 0.05 and about 0.1 and the ratio of equivalents of hydroxy carboxylic acid anion to equivalents of total complexed metal is within the area EFGH. Hydrogels having the latter equivalent ratio characteristics are particularly resistant to disintegration upon washing or otherwise wet processing.

The hydrosol formed in accordance with the present process is characterized by an inherent capacity to set to a hydrogel upon lapse of a suitable period of time without addition to or subtraction from the hydrosol of any substance. The resulting hydrogel may be allowed to set in the form of a mass which is thereafter broken up or cut up into particles for wet processing. An alternate method for preparing the hydrogel particles is to drop the hydrosol in the form of globules into a column of water-immiscible liquid so that spheroidal bead-like particles of hydrogel are formed upon gelation of the hydrosol globules while maintained in the liquid.

The particles of hydrogel, after formation, are suitably, but not necessarily, aged in a water-immiscible media such as oil at an elevated temperature above about 100° F. for between about 1 and about 48 hours. Hydrogel containing a major proportion of alumina formed in accordance with the above-described method is generally subject to a loss of aluminum as alkali metal aluminate if immediately washed with water. This tends to weaken the hydrogel to such an extent that it becomes susceptible to disintegration in the wash water. Such adverse effect can be avoided by treating the freshly formed alumina-containing hydrogel with an aqueous solution having a pH of greater than 4 but less than the pH of the hydrogel. A suitable representative treating medium is an ammonium salt solution, for example, solutions of ammonium chloride, ammonium sulfate, ammonium nitrate, and ammonium acetate. Thus, in a typical operation, the fresh hydrogel, either with or without the aforementioned oil treatment, is contacted with a 20 percent by weight solution of an ammonium salt. The pH of the solution is greater than 4 and preferably in the range of 6 to 10. During contact of the hydrogel and ammonium salt solution, the alkali metal contained in the hydrogel is removed therefrom by base exchange and the alumina becomes fixed. If the pH is higher than 10, the alkali metal becomes more difficult to remove. On the other hand, if the pH is less than 4, the soluble anions become more difficult to wash out. It has been found advisable to maintain a solution of the aforementioned pH range in contact with the freshly formed alumina-containing hydrogel for some time after formation. For example, the solution is suitably recirculated through the fresh hydrogel for 2 to 48 hours after forming in order to fix the alumina.

The hydrogel may thereafter be washed with water or water containing a small amount of electrolyte to prevent the alumina from peptizing. If the salt used for treating decomposes upon heating, the hydrogel may be partially washed to remove soluble ions which do not decompose upon heating and the remainder of the impurities removed by tempering.

Thus, the alkali metal ion from the aluminate solution may be replaced by treating in a concentrated salt solution. Additional components may be introduced into the gel by ion exchange during this step. The salt may be one which decomposes upon heating, such as $NH_4NO_3$, or a salt such as $(NH_4)_2SO_4$, which introduces a non-metallic ion which can be washed out or removed upon heating or a polyvalent metal salt which will introduce a metal ion into the gel structure. Also, additional components may be introduced into the hydrogel during the base exchange operation. Likewise, additional components may be introduced by impregnation during the hydrogel stage or by impregnation of the dried and/or calcined gel. Additional components, when desired, may further be introduced by dissolving in one or more of the hydrosol-forming solutions or by dispersing in the already formed hydrosol. Also, anions, such as silicate may be introduced by dissolving in the alkaline reactant solution, or in the form of an individual reactant stream.

The washed hydrogel can be satisfactorily dried in either superheated steam or heated air. The hydrogel so dried may thereafter be calcined at an elevated temperature generally within the approximate range of 350° F. to 1400° F. The particular temperature chosen for calcination will depend, in part, on the use to be made of the finished gel. Thus, where the gel is to be employed as an adsorbent, it is calcined at a temperature in the approximate range of 350° F. to 800° F. If on the other hand, the gel is to be used as a catalyst or catalyst support, the temperature of calcination is generally between about 800° F. and about 1400° F.

The invention may be illustrated by the following non-limiting examples:

EXAMPLE 1

An alumina-chromia hydrogel was prepared from the following reactants:

Solution A: Sodium aluminate solution having a specific gravity at 60° F. of 1,395, containing by weight 29.6% sodium aluminate, 5.0% sodium hydroxide, and 65.4% water.

Solution B: Acid solution having a specific gravity at 60° F. of 1.229 and containing by weight 38.0% citric acid, 10.5% chromium nitrate, $[Cr(NO_3)_3 \cdot 9H_2O]$ and 51.5% water.

Solution A flowing at a rate of 580 cc./min. was mixed in a nozzle with Solution B, flowing at a rate of 288 cc./min. The hydrosol so formed, having a concentration of 188 grams $Al_2O_3$—$Cr_2O_3$ per liter was poured into a tray and set therein at a temperature of 140° F. to a hydrogel in less than 1 second. The resulting hydrogel was hard and had a pH of 12.2. The ratio of equivalents of nitrate to equivalents of sodium was 0.071 and the ratio of equivalents of citric acid to equivalents of metal complexed (aluminum and chromium) was 0.213.

The hydrogel so obtained was dark blue in color and was thereafter treated 24 hours with a 20% by weight aqueous ammonium nitrate solution which had a pH of 6.2. The hydrogel was thereafter continuously washed for about 144 hours to remove water-soluble impurities from the hydrogel. The hydrogel did not undergo any disintegration during the foregoing wet processing steps. The washed material was then dried in steam at 235–325° F. for 5½ hours and then calcined 2 hours at 1000° F. in air. The resulting gel has a surface area of 362 square meters per gram and contained approximately 5.8 weight percent of chromia and approximately 94.2 weight percent of alumina.

Examples 2 to 8, employing various inorganic water-soluble metal compounds, hydroxy carboxylic acids, and alkali metal aluminates, carried out following the general procedure of Example 1, are set forth in Table I below:

*Table I*

| Ex. No. | Forming |||||||||||
|---|---|---|---|---|---|---|---|---|---|---|---|
| | Alkali metal aluminate solution |||||| Acid solution |||||
| | Alkali metal aluminate || Alkali metal hydroxide || $H_2O$, percent weight | Sp.gr. @ 60° F. | Rate, cc./min. | Metal compound || Acid || $H_2O$, percent weight | Sp.gr. @ 60° F. | Rate, cc./min. |
| | Type | Percent weight | Type | Percent weight | | | | Type | Percent weight | Type | Percent weight | | | |
| 2 | $NaAlO_2$ | 29.6 | NaOH | 5.0 | 65.4 | 1.395 | 580 | $AgNO_3$ | 12.6 | Citric | 35.8 | 51.6 | 1.304 | 310 |
| 3 | $NaAlO_2$ | 29.6 | NaOH | 5.0 | 65.4 | 1.395 | 580 | $Mg(NO_3)_2 \cdot 6H_2O$ | 10.1 | do | 38.3 | 51.6 | 1.217 | 308 |
| 4 | $NaAlO_2$ | 29.6 | NaOH | 5.0 | 65.4 | 1.394 | 200 | $H_2PtCl_6$ / $AlCl_3$ | 0.63 / 3.57 | do | 43.2 | 52.6 | 1.235 | 86 |
| 5 | $KAlO_2$ | 35.4 | KOH | 7.2 | 57.4 | 1.426 | 200 | $Na_2B_4O_7 \cdot 10H_2O$ | 10.4 | Glycolic | 36.4 | 53.2 | 1.180 | 127 |
| 6 | $KAlO_2$ | 35.4 | KOH | 7.2 | 57.4 | 1.426 | 200 | $Co(NO_3)_2 \cdot 6H_2O$ / $(NH_4)_6Mo_7O_{24} \cdot 4H_2O$ | 4.9 / 5.0 | Lactic | 45.0 | 45.1 | 1.190 | 120 |
| 7 | $NaAlO_2$ | 29.6 | NaOH | 5.1 | 65.3 | 1.402 | 184 | $ZrOCl_2 \cdot 8H_2O$ | 10.4 | Tartaric | 35.6 | 54.0 | 1.254 | 110 |
| 8 | $NaAlO_2$ | 29.6 | NaOH | 5.1 | 65.3 | 1.402 | 184 | $Mn(NO_3)_2 \cdot 6H_2O$ | 9.4 | Ammonium citrate | 41.6 | 49.0 | 1.247 | 112 |

Table I—Continued

| Ex. No. | Hydrosol properties | | | | | | Processing | | | | | | | Gel properties | | |
|---|---|---|---|---|---|---|---|---|---|---|---|---|---|---|---|---|
| | Time, sec. | Temp., °F. | pH | Grams metal oxide per liter hydrosol | Equivalents of hydroxy-carboxylic acid anion/equivalents of total complexed metal | Equivalents of inorganic anion/equivalents of alkali metal | Base exchange in 20% weight NH₄NO₃ | | Water wash, duration in hrs. | Drying | | Surface (Sq. meters/gram) | Composition (approx. weight percent) | | |
| | | | | | | | pH | Duration in hrs. | | Temp., °F. | Time (hrs.) | | Analyzed | | |
| 2 | 0.5 | 135 | 11.9 | 246 | 0.228 | 0.076 | 6.4 | 24 | 168 | 235–325 | 5½ | 361 | Ag₂O, 1.8% | Al₂O₃, 98.2. |
| 3 | 0.5 | 140 | | 175 | 0.226 | 0.075 | 7.0 | 24 | 336 | 235–325 | 5½ | 358 | MgO, 3.6% | Al₂O₃, 96.4. |
| 4 | 20 | 136 | 11.5 | 181 | 0.21 | 0.067 | 6.2 | 24 | 144 | 235 | 5½ | 321 | Pt, 0.2% | Al₂O₃, 99.8. |
| | | | | | | | | | | | | | Calculated | | |
| 5 | 2–3 | 144 | 12.4 | 184 | 0.229 | 0.069 | 7–10 | 24 | 62 | 235 | 9 | | B₂O₃, 11.2% | Al₂O₃, 88.2. |
| 6 | <1 | 124 | 12.1 | 190 | 0.225 | 0.064 | 7–10 | 24 | 127 | 235 | 9 | | {CoO, 3.0% / MoO₃, 9.4%} | Al₂O₃, 87.6. |
| 7 | ¹18 | 150 | 12.0 | 181 | 0.220 | 0.072 | 7–10 | 24 | 38 | 235 | 9 | | ZrO₂, 10.4% | Al₂O₃, 89.6. |
| 8 | <1 | 95 | 12.1 | 172 | 0.228 | 0.072 | 7–10 | 24 | 86 | 235 | 9 | | MnO, 6.3% | Al₂O₃, 93.7. |

¹ Hours.

It will be seen from the above table that alumina-metal oxide and alumina-metal gels may be prepared in accordance with the present procedure utilizing an alkali metal aluminate, hydroxy carboxylic acid or salt thereof, and water-soluble metal compound system with a wide variety of reactants. Thus, the desired gels were formed using citric acid (Examples 1 to 4), glycolic acid (Example 5), lactic acid (Example 6), tartaric acid (Example 7), and a hydroxy carboxylic acid salt, i.e., ammonium citrate (Example 8). Gels were formed containing alumina and a metal component of metals of groups I B (Example 2), II (Example 3), III (Examples 4 and 5), IV (Example 7), VI (Examples 1 and 6), VII (Example 8), and VIII (Examples 4 and 6) of the periodic table. Gels were also formed by cogelling with alumina one or more metal components. Thus, Examples 4 and 6 illustrate the use of two metal-containing compounds for reaction with alkali metal aluminate and hydroxy carboxylic acid solutions. All of the gels prepared following the teachings of this invention were resistant to disintegration upon wet processing. In contradistinction, comparable preparation of an alumina-containing hydrogel formed by reaction of an alkali metal aluminate and a hydroxy carboxylic acid without any added water-soluble metal compound yielded a hydrogel which underwent considerable disintegration upon wet processing, indicating that the presence of added metal-containing compound in the reaction mixture is essential in obtaining a resulting alumina-containing hydrogel which does not undergo appreciable disintegration upon extended contact thereof with aqueous media.

It is contemplated that the alumina-metal and alumina-metal oxide gels produced in accordance with the process of this invention may be used as desiccants, adsorbents, treating, refining or purifying agents, or as a catalyst support, catalyst or component of a catalyst for the conversion of organic compounds and particularly the conversion of hydrocarbons. Thus composites of alumina with other metal oxides and metals have been widely employed as catalysts in cracking, reforming, and desulfurization of petroleum hydrocarbons. Alumina-containing catalysts have also been used in hydrogenation, oxidation, and dehydration reactions. Typical alumina-containing cracking catalysts include composites of boria-alumina, zirconia-alumina, and beryllia-alumina. Reforming catalysts include composites of chromia-alumina, molybdena-alumina, and platinum-alumina. One commercially employed desulfurization catalyst is made up of a composite of cobalt oxide, molybdena, and alumina. Composites of alumina and silver are useful in catalytically promoting oxidation reactions. Likewise, catalytic composites of alumina with various other metals and metal oxides as indicated hereinabove may be prepared in accordance with the process of this invention. Also, it is contemplated that other constituents may be incorporated in the hydrosol, hydrogel or impregnated on the finished gel product produced in accordance with the method described herein. Such catalysts are particularly valuable in the form of hard spheroidal particles since they are thereby rendered more resistant to abrasion and and are hence well adapted to either static or moving-bed type hydrocarbon conversion systems wherein the catalyst moves in a closed path, including a reactor and a regenerator.

It is to be understood that the above description is merely illustrative of preferred embodiments of the invention, of which many variations may be made by those skilled in the art without departing from the spirit thereof.

We claim:

1. A process for preparing an inorganic gel consisting essentially of a major proportion of alumina and a minor proportion of at least one other component selected from the group consisting of a metal and metal oxide, which comprises forming a hydrosol characterized by an inherent capacity to set to a hydrogel upon lapse of a suitable period of time by intimately admixing aqueous solutions of an alkali metal aluminate, an inorganic water-soluble, metal-containing compound which, upon subsequent decomposition, furnishes said component and a compound selected from the group consisting of a hydroxy carboxylic acid and salts thereof in such proportions as to yield an alkaline hydrosol in which the ratio equivalents of total inorganic anion to total alkali metal is between about 0.005 and about 0.2 and the ratio equivalents of hydroxy carboxylic acid anion to complexed metal is within the area ABCD of the accompanying drawing, maintaining the resulting hydrosol without addition to or subtraction from said sol of any substance until the same sets to a hydrogel, treating the resulting hydrogel with an ammonium salt solution having a pH in the approximate range of 4 to 10 for a period of at least two hours, washing the treated hydrogel free of water-soluble impurities, and drying.

2. A process for preparing an inorganic gel consisting essentially of a major proportion of alumina having a minor proportion of at least one other metal oxide, which comprises forming a hydrosol characterized by an inherent capacity to set to a hydrogel upon lapse of a suitable period of time by intimately admixing aqueous solutions of an alkali metal aluminate, a metal mineral acid salt which, upon subsequent decomposition, furnishes said metal oxide and a compound selected from the group consisting of a hydroxy carboxylic acid and salts thereof to yield a hydrosol having a pH between about 10.5 and about 12.5 and a solids content between about 5 and about 30 percent by weight and in which the ratio equivalents of metal salt anion to alkali metal is between about 0.005 and about 0.2 and the ratio equivalents of hydroxy carboxylic acid anion to complexed metal is within the area ABCD of the accompanying drawing, maintaining the resulting hydrosol without addition to or subtraction from said sol of any substance until the same sets to a hydrogel, washing the resulting hydrogel free of water-soluble impurities, and thereafter drying.

3. A process for preparing an inorganic gel consisting essentially of a major proportion of alumina and a minor proportion of at least one other component selected from the group consisting of a metal and metal oxide, which comprises forming a hydrosol characterized by an inherent capacity to set to a hydrogel upon lapse of a suitable period of time by intimately admixing aqueous solutions of an alkali metal aluminate, an inorganic water-soluble, metal-containing compound which, upon subsequent decomposition, furnishes said component and a compound selected from the group consisting of a hydroxy carboxylic acid and salts thereof in such proportions as to yield an alkaline hydrosol in which the ratio equivalents of the anion of said metal-containing compound to alkali metal is between about 0.05 and about 0.1 and the ratio equivalents of hydroxy carboxylic acid anion to complexed metal is within the area EFGH of the accompanying drawing, maintaining the resulting hydrosol without addition to or subtraction from said sol of any substance until the same sets to a hydrogel, treating the resulting hydrogel with an ammonium salt solution having a pH in the approximate range of 4 to 10 for a period of at least two hours, washing the treated hydrogel free of water-soluble impurities, and drying.

4. A process for preparing an inorganic gel consisting essentially of a major proportion of alumina having a minor proportion of at least one other metal oxide, which comprises forming a hydrosol characterized by an inherent capacity to set to a hydrogel upon lapse of a suitable period of time by intimately admixing aqueous solutions of an alkali metal aluminate, a metal mineral acid salt which, upon subsequent decomposition, furnishes said metal oxide and a compound selected from the group consisting of a hydroxy carboxylic acid and salts thereof to yield a hydrosol having a pH between about 10.5 and about 12.5 and a solids content between about 5 and about 30 percent by weight and in which the ratio equivalents of metal salt anion to alkali metal is between about 0.05 and about 0.1 and the ratio equivalents of hydroxy carboxylic acid anion to complexed metal is within the area EFGH of the accompanying drawing, maintaining the resulting hydrosol without addition to or subtraction from said sol of any substance until the same sets to a hydrogel, washing the resulting hydrogel free of water-soluble impurities, and thereafter drying.

5. A process for preparing an inorganic gel consisting essentially of a major proportion of alumina and a minor proportion of chromia, which comprises forming a hydrosol characterized by an inherent capacity to set to a hydrogel upon lapse of a suitable period of time by intimately admixing an aqueous solution of an alkali metal aluminate, an inorganic water-soluble chromium salt, and a compound selected from the group consisting of a hydroxy carboxylic acid and salts thereof in such proportions as to yield an alkaline hydrosol in which the ratio equivalents of total inorganic anions to total alkali metal is between about 0.005 and about 0.2 and the ratio equivalents of hydroxycarboxylic acid anion to complexed aluminum and chromium is within the area ABCD of the accompanying drawing, maintaining the resulting hydrosol without addition to or subtraction from said sol of any substance until the same sets to a hydrogel, treating the resulting hydrogel with an ammonium salt solution having a pH in the approximate range of 4 to 10 for a period of at least two hours, washing the treated hydrogel free of water-soluble impurities, and drying.

6. A process for preparing an inorganic gel consisting essentially of a major proportion of alumina and a minor proportion of platinum, which comprises forming a hydrosol characterized by an inherent capacity to set to a hydrogel upon lapse of a suitable period of time by intimately admixing aqueous solutions of an alkali metal aluminate, chloroplatinic acid, and a compound selected from the group consisting of a hydroxy carboxylic acid and salts thereof in such proportions as to yield an alkaline hydrosol in which the ratio equivalents of total inorganic anions to total alkali metal is between about 0.005 and about 0.2 and the ratio equivalents of hydroxycarboxylic acid anion to complexed aluminum and platinum is within the area ABCD of the accompanying drawing, maintaining the resulting hydrosol without addition to or subtraction from said sol of any substance until the same sets to a hydrogel, treating the resulting hydrogel with an ammonium salt solution having a pH in the approximate range of 4 to 10 for a period of at least two hours, washing the treated hydrogel free of water-soluble impurities, and drying.

7. A process for preparing an inorganic gel consisting essentially of a major proportion of alumina and a minor proportion of molybdena, which comprises forming a hydrosol characterized by an inherent capacity to set to a hydrogel upon lapse of a suitable period of time by intimately admixing an aqueous solution of an alkali metal aluminate, and inorganic water-soluble molybdenum salt, and a compound selected from the group consisting of a hydroxy carboxylic acid and salts thereof in such proportions as to yield an alkaline hydrosol in which the ratio equivalents of total inorganic anions to total alkali metal is between about 0.005 and about 0.2 and the ratio equivalents of hydroxycarboxylic acid anion to complexed aluminum and molybdenum is within the area ABCD of the accompanying drawing, maintaining the resulting hydrosol without addition to or subtraction from said sol of any substance until the same sets to a hydrogel, treating the resulting hydrogel with an ammonium salt solution having a pH in the approximate range of 4 to 10 for a period of at least two hours, washing the treated hydrogel free of water-soluble impurities, and drying.

8. A process for preparing an inorganic gel consisting essentially of a major proportion of alumina and a minor proportion of silver oxide, which comprises forming a hydrosol characterized by an inherent capacity to set to a hydrogel upon lapse of a suitable period of time by intimately admixing an aqueous solution of an alkali metal aluminate, an inorganic water-soluble silver salt, and a compound selected from the group consisting of a hydroxy carboxylic acid and salts thereof in such proportions as to yield an alkaline hydrosol in which the ratio equivalents of total inorganic anions to total alkali metal is between about 0.005 and about 0.2 and the ratio equivalents of hydroxycarboxylic acid anion to complexed aluminum and silver is within the area ABCD of the accompanying drawing, maintaining the resulting hydrosol without addition to or subtraction from said sol of any substance until the same sets to a hydrogel, treating the resulting hydrogel with an ammonium salt solution having a pH in the approximate range of 4 to 10 for a period of at least two hours, washing the treated hydrogel free of water-soluble impurities, and drying.

9. A process for preparing an inorganic gel consisting essentially of a major proportion of alumina and a minor proportion of the oxides of cobalt and molybdenum, which comprises forming a hydrosol characterized by an inherent capacity to set to a hydrogel upon lapse of a suitable period of time by intimately admixing an aqueous solution of an alkali metal aluminate, inorganic water-soluble salts of cobalt and molybdenum, and a compound selected from the group consisting of a hydroxy carboxylic acid and salts thereof in such proportions as to yield an alkaline hydrosol in which the ratio equivalents of total inorganic anions to total alkali metal is between about 0.005 and about 0.2 and the ratio equivalents of hydroxycarboxylic acid anion to complexed aluminum, cobalt and molybdenum is within the area ABCD of the accompanying drawing, maintaining the resulting hydrosol without addition to or subtraction from said sol of any substance until the same sets to a hydrogel, treating the resulting hydrogel with an ammonium salt solution having a pH in the approximate range of 4 to 10 for a period of at least two hours, washing the treated hydrogel free of water-soluble impurities, and drying.

10. A process for preparing an inorganic gel consisting essentially of a major proportion of alumina and a minor proportion of at least one other component selected from the group consisting of a metal and metal oxide, which comprises forming a hydrosol characterized by an inherent capacity to set to a hydrogel upon lapse of a suitable period of time by intimately admixing aqueous solutions of an alkali metal aluminate, an inorganic water-soluble compound which, upon subsequent decomposition, furnishes said component, and a compound selected from the group consisting of a hydroxycarboxylic acid and salts thereof in such proportions as to yield an alkaline hydrosol in which the ratio equivalents of total inorganic anion to total alkali metal is between about 0.005 and about 0.2 and the ratio equivalents of hydroxycarboxylic acid anoin to complexed metal is within the area ABCD of the accompanying drawing, maintaining the resulting hydrosol without addition to or subtraction from said sol of any substance until the same sets to a hydrogel, washing the resulting hydrogel free of water-soluble impurities, and drying.

References Cited in the file of this patent
UNITED STATES PATENTS

| | | |
|---|---|---|
| 2,762,783 | Kimberlin et al. | Sept. 11, 1956 |
| 2,769,688 | Milliken et al. | Nov. 6, 1956 |
| 2,773,839 | Stover et al. | Dec. 11, 1956 |
| 2,773,845 | Stover et al. | Dec. 11, 1956 |

UNITED STATES PATENT OFFICE
CERTIFICATE OF CORRECTION

Patent No. 2,927,902                          March 8, 1960

Robert H. Cramer et al.

It is hereby certified that error appears in the printed specification of the above numbered patent requiring correction and that the said Letters Patent should read as corrected below.

Column 2, line 28, for "of preparing" read -- for preparing --; column 6, line 21, for "1,395" read -- 1.395 --; line 47, for "has" read -- had --; columns 5 and 6, Table I, ninth column thereof, under the heading "Metal compound" and subheading "Type", fifth line, for "$Na_2B_4O,.10H_2O$" read -- $Na_2B_4O_7.10H_2O$ --; column 7 and 8, Table I-Continued, thirteenth column thereof, under the heading "Gel properties" for the subheading "Surface (Sq. meters/gram)" read -- Surface Area (Sq. meters/gram) --; column 10, line 28, for "and inorganic" read -- an inorganic --.

Signed and sealed this 13th day of September 1960.

(SEAL)
Attest:

KARL H. AXLINE                               ROBERT C. WATSON
Attesting Officer                         Commissioner of Patents